Patented Aug. 6, 1929.

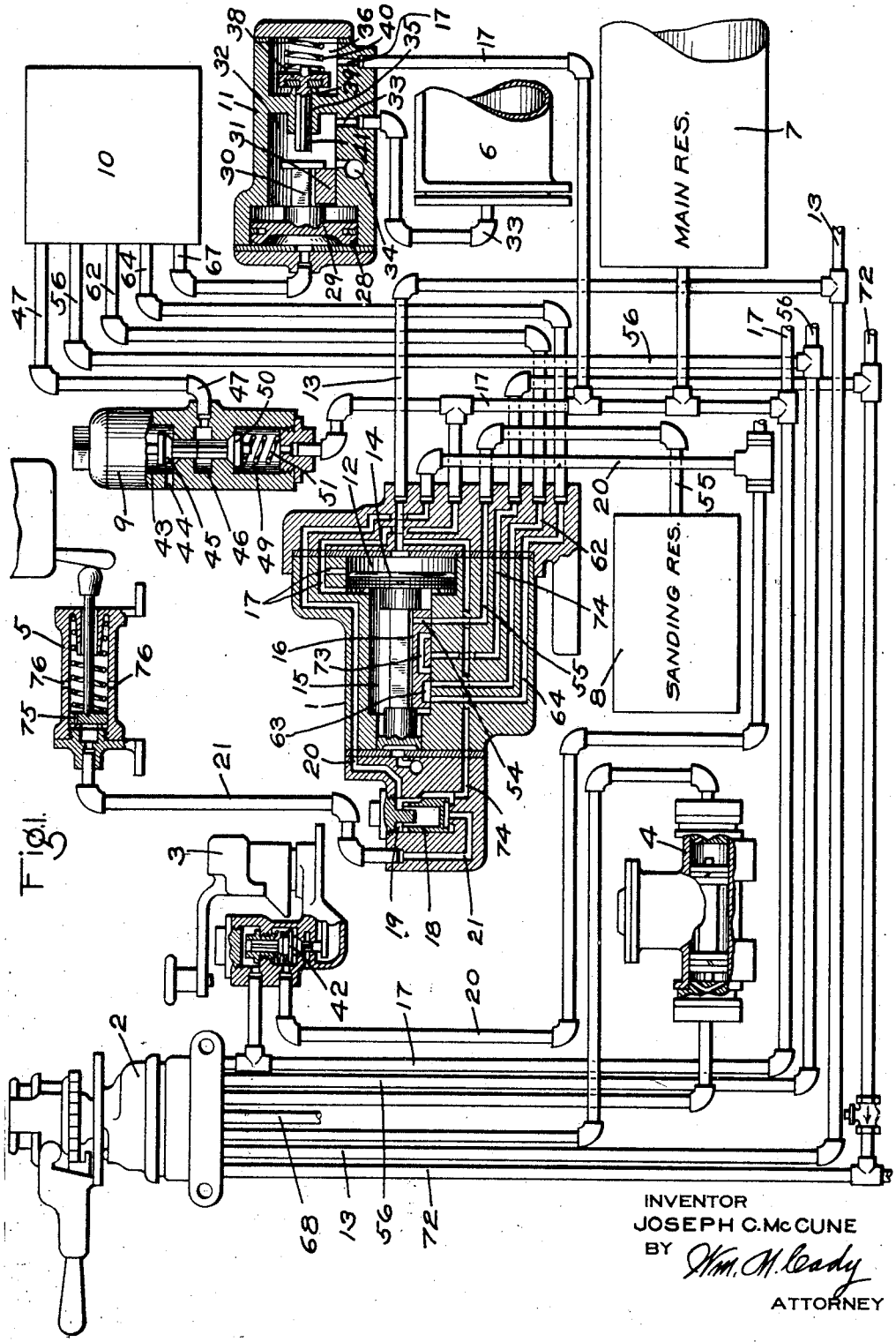

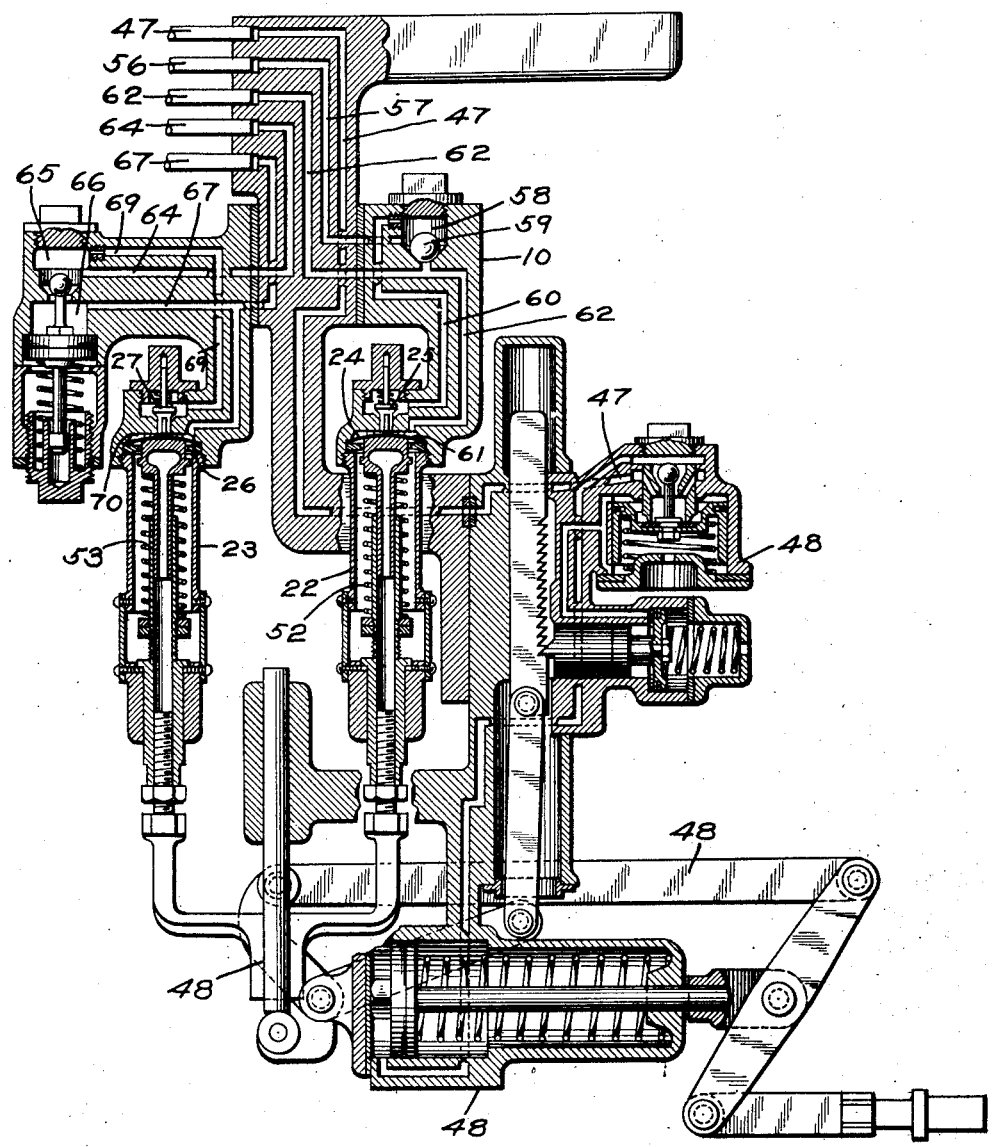

1,723,191

UNITED STATES PATENT OFFICE.

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VARIABLE LOAD VALVE DEVICE.

Application filed October 27, 1927. Serial No. 228,993.

This invention relates to fluid pressure brakes, and more particularly to a brake equipment of the type known as the "safety car control equipment."

An object of my invention is to provide a "safety car control equipment" with means for varying the braking power according to the load on the car, and to so arrange said means, that the parts of the usual "safety car control equipment" are utilized without alteration, to control the braking power.

Another object of my invention is to associate a variable load mechanism and a relay valve device with the usual "safety car control equipment" in such a manner that fluid under pressure from any desired source may be supplied to the brake cylinder or fluid under pressure from the brake cylinder may be vented to the atmosphere without first having to flow through the variable load mechanism or any part of the "safety car control equipment," thus rendering it possible to effect an application or release of the brakes more quickly than by the use of apparatus in which fluid under pressure is supplied to brake cylinder or vented to the atmosphere through a variable load mechanism or some part of the "safety car control equipment."

A further object of the invention is to provide a novel variable load mechanism in which the usual service and emergency supply valves, for controlling the supply of fluid under pressure to the brake cylinder, are omitted, and with which a single valve device may be associated to control the supply of fluid under pressure to the brake cylinder in effecting a service or an emergency application of the brakes, which valve device has the additional function of controlling the flow of fluid from the brake cylinder in releasing the brakes.

Other objects and advantages of the invention will appear from the following more detailed description.

In the accompanying drawings, Fig. 1 illustrates, in diagrammatic form, a fluid pressure brake of the "safety car control" type embodying my invention; and Fig. 2 is vertical sectional view, in diagrammatic form, of a variable load mechanism constructed in accordance with the invention.

A "safety car control equipment" of the usual type is shown in Fig. 1 of the drawings, which comprises in general, an emergency valve device 1, a brake valve device 2, a safety car controller handle device 3, a door engine 4, a circuit breaker cylinder device 5, a brake cylinder 6, a main reservoir 7, a sanding reservoir 8 and a magnet valve device 9. According to my invention there is associated with this "safety car control equipment," a variable load mechanism 10 and a relay valve device 11.

The emergency valve device 1 comprises a casing having a piston chamber 12 connected to an emergency pipe 13 and containing a piston 14. This device also has a valve chamber 15 containing a slide valve 16 adapted to be operated by the piston 14. The chambers 12 and 15 are both connected to the main reservoir 7 through a pipe and passages 17. A relay valve piston 18 is associated with the emergency valve device and has the piston chamber 19, at one side, connected through a passage and pipe 20, to the safety car controller handle device 3. The chamber on the opposite side of this relay valve is connected to the circuit breaker cylinder device 5, through a passage and pipe 21.

The variable load mechanism 10 is for the purpose of automatically regulating the maximum brake cylinder pressure in either a service or an emergency application of the brakes as the load on the car is increased or decreased, and in many respects is similar to the variable load mechanism disclosed in United States Letters Patent No. 1,505,950 of Clyde C. Farmer, dated August 26, 1924. The variable load mechanism shown in the drawings may comprise a casing with which there is associated, a service brake cylinder pressure limiting valve device 22 and an emergency brake cylinder pressure limiting valve device 23. The valve device 22 comprises a flexible diaphragm 24 for operating a valve 25 and the valve device 23 comprises a flexible diaphragm 26 for operating a valve 27, which valves control the supply of fluid under pressure to a piston chamber 28 formed in the casing of the relay valve device 11. Contained within the piston chamber 28 is a piston 29 having a piston stem 30 which is adapted to operate a slide valve 31 contained in a valve chamber 32 which is connected to the brake cylinder through a pipe and passage 33 and is normally connected to the atmosphere through a passage 34. Formed in the casing of the relay valve device and adapted to communicate, through a passage 35, with the chamber 32, is a chamber 36 which is connected to the main reservoir 7 by the pipe and passage 17. Contained within this chamber 36 is a valve 38 which is normally maintained seated against a seat ring 39 by a spring 40, thus normally closing communication between the chambers 32 and 36. The valve 38 is provided with a fluted stem 41 which extends through the passage 35 and projects into the chamber 32 a sufficient distance, that the piston stem will engage it and thereby unseat the valve 38 when an application of the brake is effected.

The safety car controller handle device 3 comprises a double seating valve 42, which is movable, by the controller handle of the device, to effect a connection between the main reservoir pipe 17 and the pipe 20 or to vent the pipe 20 to the atmosphere.

The magnet valve device 9 may comprise a casing having a magnet portion adapted to be energized upon the opening of the car door or doors (not shown) and deenergized upon the closing of the door or doors. Contained within a valve chamber 43, which is connected to the atmosphere through a passage 44, is a valve 45 which is adapted to control communication between this chamber and a chamber 46, connected, through a pipe and passage 47, to an adjusting mechanism 48 of the variable load mechanism. Contained within a valve chamber 49 which is connected to the main reservoir 7, by pipe 17, is a valve 50 which is adapted to control communication between this chamber and the chamber 46. The valves 45 and 50 have fluted stems which are adapted to engage with each other so that the operation of one valve insures the operation of the other. A spring 51 contained in the valve chamber 49 tends to maintain the valve closed.

The adjusting mechanism 48 is for the purpose of adjusting the compression of springs 52 and 53 which act upon the flexible diaphragms 24 and 26 respectively to regulate the maximum brake cylinder pressure in accordance with the load on the car, and as this mechanism is of the same general character as that disclosed in the above mentioned patent, a detailed description thereof is deemed unnecessary.

Assuming the several parts of the invention to be in their normal release positions, as shown in the drawings, the brake cylinder 6 is vented to the atmosphere through pipe and passage 33 and slide valve chamber 32 and passage 34 of the relay valve device 11, and the piston chamber 12 and slide valve chamber 15 of the emergency valve device 1, chamber 50 of the magnet valve device 9 and chamber 36 of the relay valve device 11 will be charged with fluid at main reservoir pressure through pipes and passages 17. The sanding reservoir 8 is charged with fluid at main reservoir pressure from the valve chamber 15 of the emergency valve device, through a passage 54 in the slide valve 16 and through passage and pipe 55.

When it is desired to effect a service application of the brakes, the brake valve 2 is moved to service position, in which fluid under pressure flows from the main reservoir 7 to the piston chamber 28 of the relay valve device 11 through the main reservoir pipe 17 and service or straight air pipe 56, and passage 57 in the casing of the variable load mechanism to a valve chamber 58 containing a ball check valve 59 and from thence through a choked passage 60 past the open valve 25 to a chamber 61 at one side of the flexible diaphragm 24 and from thence through passages and pipe 62 leading to the slide valve seat of the emergency slide valve device 1, then through a cavity 63 in the emergency slide valve 16 and passages and pipe 64, through chambers 65 and 66 of an emergency by-pass valve device, and from thence through passage and pipe 67 to the piston chamber 28 of the relay valve device 11. Fluid under pressure supplied to the chamber 28, acting on the face of the piston 29, causes the piston to move toward the right a sufficient distance that the slide valve 31, which is operated by the piston, will close the atmosphere passage 34, and as this passage is closed, the end of the piston stem 30 will engage the stem 41 of the valve 38 and will cause said valve to be unseated from the seat ring 39, thus fluid at main reservoir pressure, in the chamber 36, flows into the slide valve chamber 32 and through pipe and passage 33, to the brake cylinder. When the pressure of the fluid in the piston chamber 28 of the relay valve device and the chamber 61 of the service limiting portion of the variable load mechanism builds up to a degree great enough to overcome the pressure of the spring 52, the flexible diaphragm 24 is deflected, which permits the valve 25 to close and shut off further supply of fluid under pressure to the chamber 28. When the pressure of the fluid supplied to the valve chamber 32 and the brake cylinder 6 exceeds the pressure of the fluid in the chamber 28, the spring 40, which has been compressed, will cause the valve 38 and piston 29 to move toward the left until the valve seats on the seat ring 39 and shuts off the further supply of fluid under pressure to the brake cylinder. To release the brakes, the brake valve device 2 is moved to release position, in which the chamber 28 is vented to the atmosphere by way of pipe and passage 67, passage and pipe 64, cavity 63 in the emergency slide valve 16, passages and pipe 62, past the ball check valve 59, through passage 57, straight air pipe 56 and exhaust pipe 68. When the fluid under pressure in the piston chamber 28 is thus vented, the fluid at brake cylinder pressure in the valve chamber 32 acts upon and moves the piston 29 and slide valve 31 to their normal positions as shown in Fig. 1 of the drawings, in which, the slide valve uncovers the passage 34, and fluid under pressure from the brake cylinder and valve chamber 32 is vented to the atmosphere through this passage.

When it is desired to effect an emergency application of the brakes, the brake valve is moved to its emergency position, which causes the emergency pipe 13 and piston chamber 12 of the emergency valve device 1 to be vented to the atmosphere, through the exhaust pipe 68, so that the fluid, at main reservoir pressure, in the slide valve chamber 15 of the emergency valve device 1, will cause the piston 14 to shift the slide valve 16 to its emergency position, in which, the passage 64, which leads to the slide valve seat, will be uncovered, and fluid under pressure in the slide valve chamber 15 flows to the chamber 28 of the relay valve device 11 by way of passage 64 in the emergency valve device 1, pipe 64 and passage 64 in the casing of the variable load mechanism, through valve chambers 65 and 66 and through passage and pipe 67 to the chamber 28. Fluid under pressure in the valve chamber 65 flows through a choked passage 69 past the open valve 27 of the emergency limiting portion of the variable load mechanism, to the chamber 70 at one side of the flexible diaphragm 26, and fluid under pressure from the passage 67 also flows to the chamber 70. Fluid under pressure thus flowing into the chamber 28 of the relay valve device 11 causes this device to operate in the same manner, to admit fluid under pressure from the main reservoir to the brake cylinder, as has hereinbefore been described in connection with the effecting of a service application of the brakes. It will be understood, however, that in effecting an emergency application of the brakes, the valve 27 and the flexible diaphragm 26 operate to regulate the pressure of fluid in the brake cylinder in accordance with the load on the car. When the slide valve 16 is in its emergency position, it will connect the sanding reservoir 8 with the sanding pipe 72 in the usual manner by way of pipe and passage 55, cavity 73 in the emergency slide valve 16 and passage 74.

Should the operator remove his hand from the controller handle of the device 3, the valve 42 will be moved upwardly and will permit fluid under pressure in the chamber 19, at one side of the valve piston 18 of the emergency valve device, to exhaust to the atmosphere through passage and pipe 20. Fluid under pressure acting on the outer seated area of valve piston 18, as supplied thereto from the emergency brake pipe 13 through a passage 74 in the emergency valve device, will now cause the valve piston 18 to move to its open position, in which fluid under pressure flows from passage 74 and emergency brake pipe 13 through the passage and pipe 21 to the circuit breaker cylinder device 5, causing the piston 75 thereof to be operated to open the power circuit in the usual manner. When this piston has moved a predetermined distance, apertures 76 in the cylinder of the device will be uncovered, and fluid under pressure from the piston chamber will thus be vented to the atmosphere, which results in the piston 14 of the emergency valve device and slide valve 16 moving to their emergency positions, after which the operation of the several parts of the apparatus are the same as hereinbefore described in connection with the effecting of an emergency application of the brakes.

To release the brakes after an emergency application of the brakes has been effected by the use of the brake valve device 2, the operator moves the brake valve device to its release position in which fluid under pressure will again be supplied to the piston chamber 12 of the emergency valve device and this fluid under pressure acting upon the face of the piston 14 causes it, together with the slide valve 16 to move to their normal positions as shown in Fig. 1 of the drawings. In this position of the slide valve 16, the cavity 63 thereof connects passages 62 and 64 of the emergency valve device 1, thus the venting of the fluid under pressure from the chamber 28 to the atmosphere, and the venting of the fluid under pressure from the brake cylinder to the atmosphere will be accomplished in the same manner as has been described in releasing the brakes after a service application thereof.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a "safety car control equipment" having a brake cylinder, of a valve device for controlling the admission and release of fluid under pressure to and from said brake cylinder, and a variable load mechanism having a service limiting portion and an emergency limiting portion either of which is adapted to control the operation of said valve device.

2. The combination with a "safety car control equipment" having a brake cylinder, of a valve device operative by fluid under pressure for controlling the admission of fluid under pressure to said brake cylinder and a variable load mechanism having a service and an emergency limiting portion, either of which is adapted to supply fluid under pressure to operate said valve means.

3. In a fluid pressure brake, the combination with a brake cylinder, of a variable load mechanism having a service limiting portion and an emergency limiting portion, either of which is adapted to supply fluid under pressure to effect an application of the brakes, and means subject to the opposing pressures supplied by either of said portions and to said brake cylinder for controlling the supply of fluid to the brake cylinder.

4. In a fluid pressure brake, the combination with a brake cylinder, of a variable load mechanism having a service limiting portion and an emergency limiting portion, either of which is adapted to supply fluid under pressure to effect an application of the brakes, and a valve device for controlling the supply of fluid under pressure to said brake cylinder, said device comprising a supply valve and a piston subject to the pressure supplied by either the service or emergency limiting portions for operating said valve to supply fluid under pressure to said brake cylinder and subject to the opposing pressures of fluid supplied to the brake cylinder and by either the service or emergency limiting portion for causing said valve to close and cut off the supply of fluid under pressure to said brake cylinder.

5. The combination with a "safety car control equipment" including a brake cylinder, of means operative to supply fluid under pressure directly to said brake cylinder, and a variable load mechanism associated with said equipment adapted to supply fluid under pressure to control the operation of said means.

6. The combination with a "safety car control equipment" including a brake cylinder, of means operative to supply fluid under pressure directly to said brake cylinder, and a variable load mechanism associated with said equipment and having a service limiting portion and an emergency limiting portion, either of which is operative to supply fluid under pressure to control the supply of fluid to said brake cylinder.

7. The combination with a "safety car control equipment" including a brake cylinder, of means operative to supply fluid under pressure directly to said brake cylinder, and a variable load mechanism associated with said equipment and having a service limiting portion and an emergency limiting portion, either of which is operative to supply fluid under pressure in accordance with the load on the car to control the supply of fluid to said brake cylinder.

8. The combination with a "safety car control equipment" including a brake cylinder, of means operative to supply fluid under pressure directly to said brake cylinder, and a variable load mechanism associated with said equipment and having a service limiting portion and an emergency limiting portion, either of which is operative to supply fluid under pressure in accordance with the load on the car to control the operation of said means.

9. The combination with a "safety car control equipment" including a brake cylinder and an emergency valve device, of a variable load mechanism having a service limiting portion and an emergency limiting portion, means operative to supply fluid under pressure to said brake cylinder, the operation of said means being controlled by fluid supplied by said service limiting portion or by said emergency limiting portion, and valve means in said emergency valve device for controlling the supply of fluid under pressure to said variable load mechanism.

10. The combination with a "safety car control equipment" including a brake cylinder, an emergency valve device, and a straight air pipe, of a variable load mechanism comprising a service limiting portion adapted to be supplied with fluid under pressure from said straight air pipe and comprising an emergency limiting portion adapted to be supplied with fluid under pressure from said emergency valve device, and a valve device controlled by fluid supplied to either of said portions for admitting fluid under pressure to said brake cylinder.

In testimony whereof I have hereunto set my hand.

JOSEPH C. McCUNE.